United States Patent Office 3,083,644
Patented Apr. 2, 1963

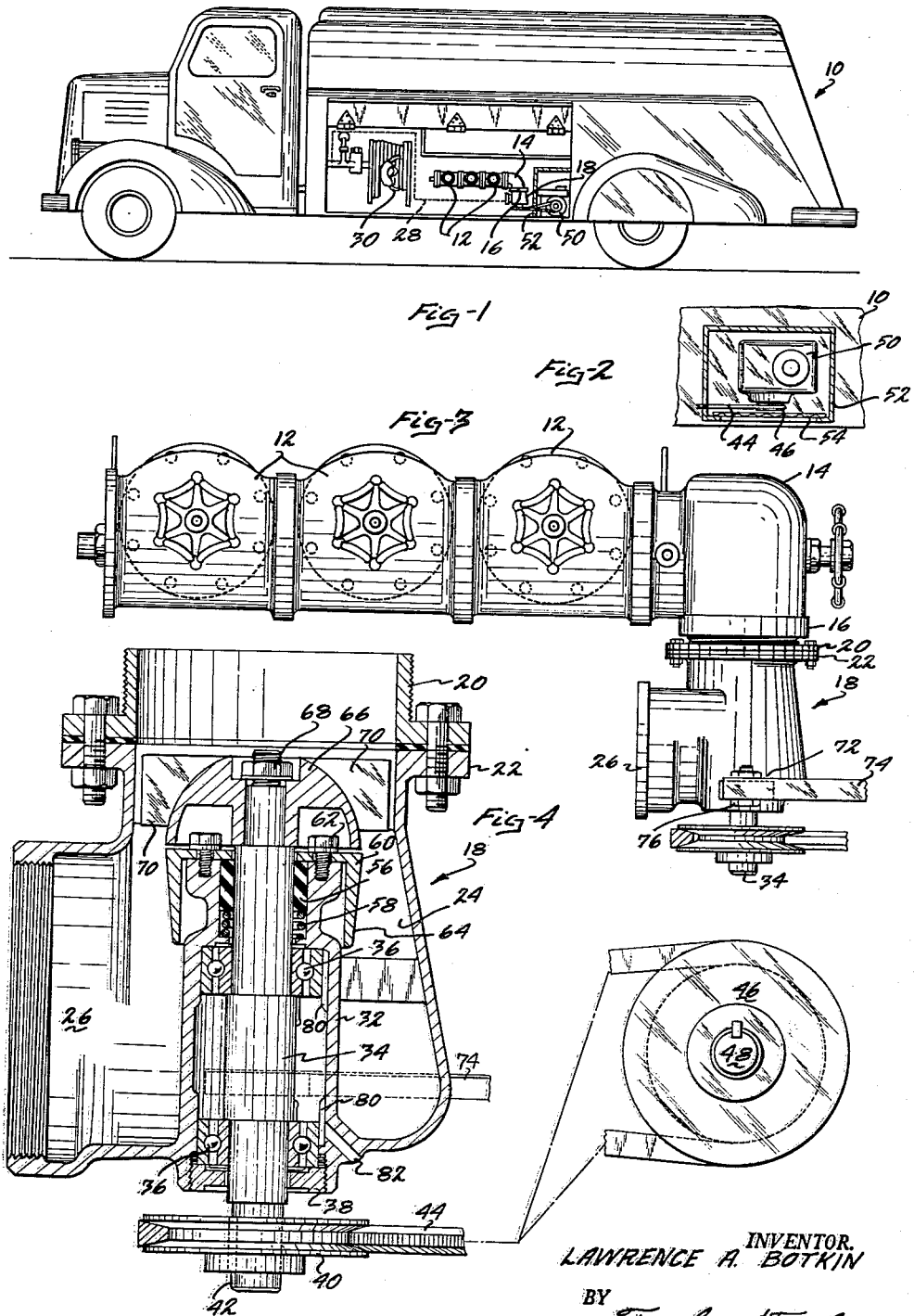

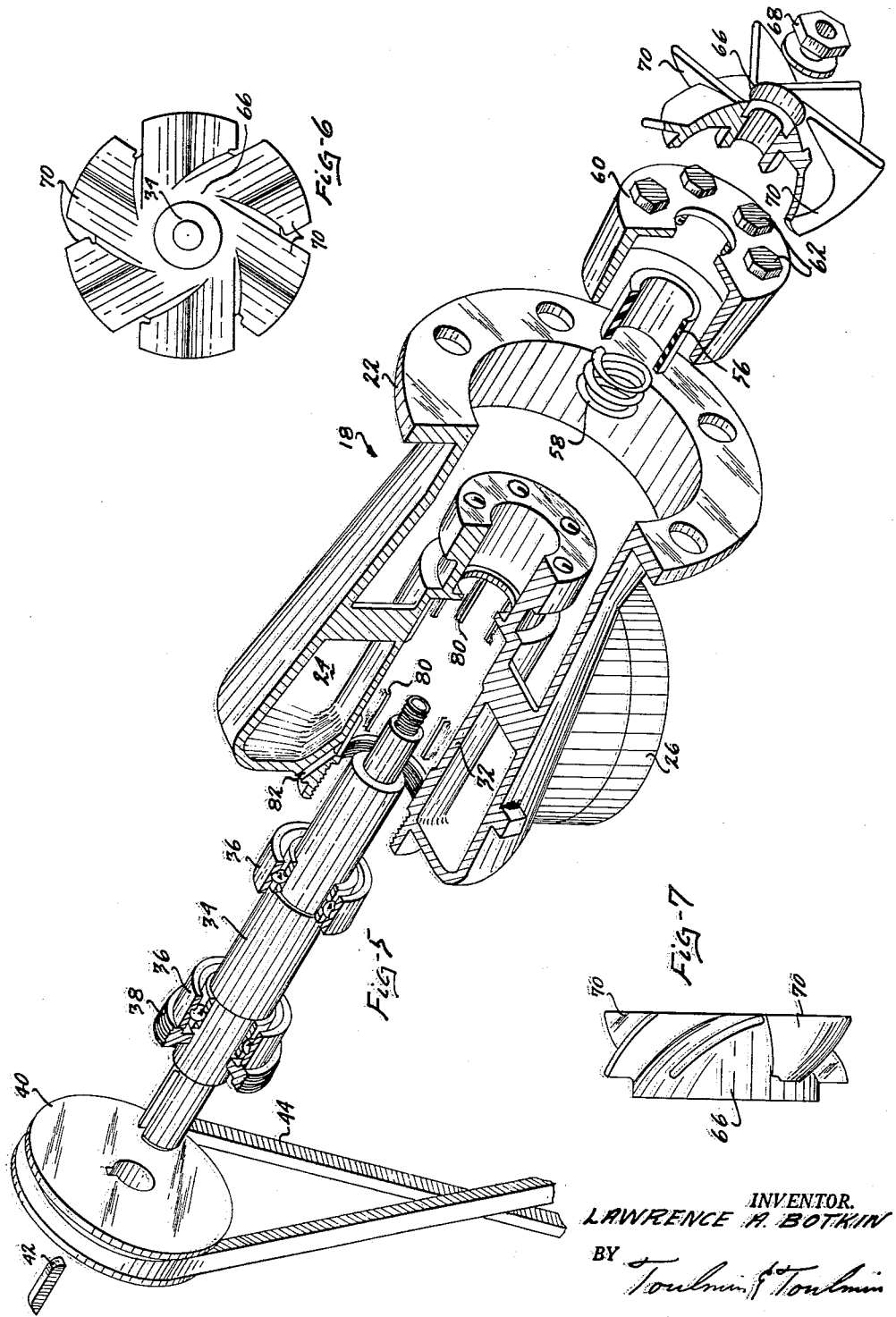

3,083,644
AXIAL FLOW BOOSTER PUMP
Lawrence A. Botkin, Dayton, Ohio, assignor to Buckeye Iron & Brass Works, Dayton, Ohio, a corporation of Ohio
Filed Sept. 14, 1960, Ser. No. 56,012
5 Claims. (Cl. 103—89)

This invention relates to pumping arrangements and is particularly concerned with a booster pump primarily for use on gasoline hauling trailers and similar devices.

Gasoline hauling trailers are provided with fuel tanks and normally are unloaded by gravity flow from the tanks. On occasion, however, it is desired to increase the rate of flow, or to elevate the liquid being discharged above what can be obtained by purely gravity flow.

The present invention proposes to deal with this situation by providing a booster pump through which the fuel being discharged passes normally by gravity but which pump can be actuated to increase the head on the fluid thereby increasing the flow rate or providing for a higher lift of the fluid than would otherwise be possible.

Another object of this invention is the provision of a novel axial flow booster pump of the nature referred to which is arranged so that it can be readily manifolded with the other valves associated with a gasoline hauling trailer thus permitting ready incorporation of the booster pump in either new or existing equipment.

Still another object is the provision of a specially designed booster pump for installation in the circumstances referred to which does not substantially reduce the rate of fluid flow in the system when the pump is not operating so that the pump can be selectively operated or not according to the particular circumstances.

These and other objects and advantages of the present invention will become more apparent upon reference to the following specification taken in connection with the accompanying drawings in which:

FIGURE 1 is a side view of a gasoline hauling trailer incorporating a booster pump according to this invention;

FIGURE 2 is a diagrammetic view showing the manner in which the drive engine for the pump is isolated from the fuel containing and fuel flow system;

FIGURE 3 is a view drawn at somewhat enlarged scale showing the manifolded valves associated with the fuel tanks of the trailer and showing the booster pump according to the present invention incorporated in the manifold system;

FIGURE 4 is a vertical sectional view through the booster pump drawn at still larger scale showing details of construction thereof;

FIGURE 5 is an exploded perspective view showing the construction of the booster pump;

FIGURE 6 is an end elevational view showing the impeller of the booster pump; and FIGURE 7 is a side elevational view of the pump impeller.

Referring to the drawings somewhat more in detail, 10 indicates a more or less conventional gasoline hauling trailer which includes a plurality of compartments for receiving gasoline or other liquids. These compartments have associated therewith the control valves 12 which may be manifolded together to form a single integral unit. The manifolding together of valves of this nature is disclosed in detail in my co-pending applications, Serial Numbers 10,218, now Patent No. 2,997,207 and 17,926 filed on February 23, 1960, and March 28, 1960, respectively.

The manifolded valves include an angle valve 14 at the discharge end of the manifold and mounted on the discharge 16 of angle valve 14 is a booster pump 18 according to the present invention. Outlet 16 of angle valve 14 has a flanged adapter member 20 mounted therein and bolted to the flanged adapter member 20 is the flange 22 at the inlet side of booster pump 18.

Booster pump 18 has flow passage 24 extending through the body thereof to outlet 26 which is preferably internally threaded so that it can be threaded into a connector or so that it can receive a bushing or a flanged adapter. Optionally, the outlet of the booster pump could have a flange integral therewith.

As will be seen in FIGURE 1, the outlet of the booster pump is connected by conduit means 28 with the hose 30 on a hose reel in the truck so that all conventional fuel handling operations can be carried out in a conventional manner.

The booster pump has a central hub portion 32 integral therewith through which there extends a drive shaft 34. This shaft is supported on spaced antifriction bearings 36, the upper one of which abuts a shoulder within hub portion 32 while the other of which is clamped in place by a nut 38. The bearings abut spaced shoulders on shaft 34 and the shaft accordingly is supported in a fixed axial position in the pump body while being freely rotatable therein.

At its lower end, shaft 34 projects from the pump body and has mounted thereon a pulley 40 keyed to the shaft by key 42 and adapted for being drivingly engaged by a V-belt 44 or some other suitable flexible driving means. V-belt 44 extends over a pulley 46 keyed to the output shaft 48 of a gasoline engine 50 which will be seen in FIGURE 1. Engine 50 is located in a compartment 52 in the truck which isolates the engine from the tanks of the truck and from the conduct system leading therefrom.

Compartment 52 has a screened opening 54 which provides for a supply of cooling air to the engine. In this manner the engine is completely isolated and the fire hazard, when the truck is carrying inflammable or explosive liquids is substantially eliminated.

Turning to FIGURE 4, it will be seen that the shaft 34 above the upper of bearings 36 passes through a seal 56 urged upwardly by spring 58. A cap 60 held in place by cap screws 62 closes the seal compartment and also forms a shroud by means of its skirt portion 64 for eliminating turbulence in the pump body so that the flow therethrough is not occasioned by any substantial loss of pressure.

At its extreme upper end, the shaft 34 supports an impeller 66 held in place by a nut 68. The impeller 66 has a substantially hemispherical hub portion that forms an extension of the aforementioned shroud 64 and extending outwardly from the hub portion is a plurality of curved blades 70. The nature of the blades 70 will be more clearly seen upon reference to FIGURES 5 and 7.

These blades provide for gravity discharge through the pump and are also efficient for driving the liquid through the pump when the impeller is driven in rotation.

To sustain the loads imposed on the pump body by V-belt 44, the pump body may be provided with apertured ears 72 which can be availed of for bolting the pump body to support members 74 by bolts 76. This will permit tension to be maintained on V-belt 44 without imposing undesirable stresses on the pump body and the manifolded valves to which it is attached and which loads might cause the joints between the valves to come loose and leak.

The arrangement of the present invention is compact and inexpensive and produces a desired boost in pressure without at the same time increasing the pressure so much that special controls are required to offset the hazards of the increased discharge pressure.

The pump according to this invention is adapted for operation at relatively high speed but by using a gasoline engine to drive the pump, the speed thereof can be varied over a relatively wide range to produce whatever results are desired.

The inlet and exit areas of the impeller of the pump and the discharge passages are arranged for the desired hydraulic performance of the pump within a minimum envelope. The proportioning of the passages is important for permitting the pump to be constructed sufficiently compactly to be received in the available space. The shape and angle of the impeller vanes are important in determining the range of speed at which the pump will operate while permitting substantially free gravity discharge through the pump when it is desired to operate the pump or in case the motive power for the pump is for any reason inoperative.

While the shaft 34 of the pump is normally adequately sealed by the seal 56 referred to, in case there is any leakage along the pump shaft, this is drained from the inside of hub 32 by having ribs 80 therein that support the bearings 36 so that the leakage fluid can pass downwardly in hub 32 and which fluid is then drained from the hub by the passage 82 at the bottom thereof.

It will be understood that this invention is susceptible to modification in order to adapt it to different usages and conditions; and, accordingly, it is desired to comprehend such modifications within this invention as may fall within the scope of the appended claims.

I claim:

1. In a pump; a body having a flow passage therethrough, an axial flow impeller rotatable in the passage, a shaft fixed to the impeller projecting from the body, said body comprising a cylindrical portion therein surrounding said shaft, antifriction bearings in the cylindrical portion supporting said shaft, and means sealing between the shaft and cylindrical portion adjacent the impeller, said means comprising a resilient annular seal element surrounding said shaft in the impeller end of said cylindrical portion, and a cap secured to the end of said cylindrical portion retaining said element therein, a spring in the cylindrical portion urging said seal element toward said cap, said cap having a skirt dependent about said cylindrical portion.

2. In a pump; a body having a flow passage therethrough, an axial flow impeller rotatable in the passage, a shaft fixed to the impeller projecting from the body, said body comprising a cylindrical portion therein surrounding said shaft, antifriction bearings in the cylindrical portion supporting said shaft, and means sealing between the shaft and cylindrical portion adjacent the impeller, said means comprising a resilient seal element in the impeller end of said cylindrical portion, and a cap secured to the end of said cylindrical portion retaining said element therein, said cap having a skirt dependent about said cylindrical portion, said shaft extending vertically downwardly from said impeller, said cylindrical portion including drain part means at the bottom, said impeller including a hub, and said hub and said cap and said cylindrical portion defining a stream line passage for fluid from said inlet through said body.

3. In a pump; a body having a body with an inlet in the top and an outlet in the side and a flow passage connecting said inlet and outlet, an axial flow impeller in the passage beneath said inlet, a shaft fixed to said impeller projecting from the body at the bottom, a cylindrical portion in the body surrounding said shaft, spaced antifriction bearings in said cylindrical portion supporting said shaft, a seal element between the cylindrical portion and shaft at the impeller end, a cap on the end of the cylindrical portion retaining the seal element therein and having a skirt dependent around said cylindrical portion, and drain port means in the bottom of said cylindrical portion to drain leakage fluid therefrom, said impeller having a hub tapering from said inlet toward said cap and about the same diameter at the cap end as said cap.

4. In a pump; a body having a flow passage therethrough, an axial flow impeller rotatable in the passage, a shaft fixed to the impeller projecting from the body, said body comprising a cylindrical portion therein surrounding said shaft, antifriction bearings in the cylindrical portion supporting said shaft, and means sealing between the shaft and cylindrical portion adjacent the impeller, said means comprising a resilient annular seal element surrounding the shaft in the impeller end of said cylindrical portion, and a cap secured to the end of said cylindrical portion retaining said element therein, a spring in said cylindrical portion urging said seal element toward said cap, said cap having a skirt dependent about said cylindrical portion, said impeller having a hemispherical hub and radial blades, said hub and the skirt portion of said cap forming a substantially continuous surface from the inlet of the flow passage past the impeller and the impeller end of said cylindrical portion.

5. A pump according to claim 1 in which said body has an inlet at the top and an outlet on the side between which said flow passage extends, said shaft extending out the bottom of said body, a pulley on said shaft for receiving a drive belt, and lug means on the pump body in the region of the bottom thereof for attachment to stationary supporting means to hold the pump solid against the pull of the drive belt engaging said pulley.

References Cited in the file of this patent

UNITED STATES PATENTS

| | | |
|---|---|---|
| 1,453,528 | Schofield | May 1, 1923 |
| 1,501,922 | Schofield | July 22, 1924 |
| 1,661,368 | Hudson | Mar. 6, 1928 |
| 2,160,741 | Jensen et al. | May 30, 1939 |
| 2,284,948 | Combs | June 2, 1942 |
| 2,394,431 | Curtis et al. | Feb. 5, 1946 |

FOREIGN PATENTS

| | | |
|---|---|---|
| 618,520 | Great Britain | Feb. 23, 1949 |